United States Patent
Ahuja et al.

(10) Patent No.: US 10,417,033 B2
(45) Date of Patent: *Sep. 17, 2019

(54) GENERATING EFFICIENT COMPUTER SECURITY THREAT SIGNATURE LIBRARIES

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US)

(73) Assignee: ShieldX Networks, Inc., San Jose, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 15/413,298

(22) Filed: Jan. 23, 2017

(65) Prior Publication Data
US 2018/0212997 A1    Jul. 26, 2018

(51) Int. Cl.
*G06F 9/455* (2018.01)
*H04L 29/06* (2006.01)

(52) U.S. Cl.
CPC ...... *G06F 9/45558* (2013.01); *H04L 63/1416* (2013.01); *G06F 2009/45587* (2013.01); *H04L 63/1433* (2013.01)

(58) Field of Classification Search
None
See application file for complete search history.

(56) References Cited

U.S. PATENT DOCUMENTS

2003/0204632 A1 * 10/2003 Willebeek-LeMair ..................... H04L 29/06 709/249
2008/0289040 A1 * 11/2008 Ithal ..................... H04L 63/1416 726/23

(Continued)

FOREIGN PATENT DOCUMENTS

CN    105933290 A    9/2016

OTHER PUBLICATIONS

Tupakula U., et al., "Intrusion Detection Techniques for Infrastructure as a Service Cloud," 2011 IEEE Ninth International Conference on Dependable, Autonomic and Secure Computing (DASA), Dec. 12, 2011, pp. 744-751. (Year: 2011).*

(Continued)

*Primary Examiner* — Trang T Doan
(74) *Attorney, Agent, or Firm* — Nicholson De Vos Webster & Elliott LLP

(57) ABSTRACT

Systems, methods, and apparatuses enable optimizing a size of computer threat signature libraries used by computer security applications to detect potential occurrences of computer and network security threats. In an embodiment, a threat signature is a pattern used by a computer security application to detect instances of potential security threats. A threat signature library is a collection of individual threat signatures, the library used in conjunction with a threat library to enable detecting a range of threats to computing devices and networks (e.g., various known viruses, malware, spam, types of network-based attacks, etc.). Based on profile information collected for a computing device, a security orchestrator optimizes the size of security threat signature libraries to be used to provide security services to the device.

20 Claims, 13 Drawing Sheets

(56) References Cited

U.S. PATENT DOCUMENTS

| | | | |
|---|---|---|---|
| 2013/0074143 A1* | 3/2013 | Bu | H04L 63/1416 |
| | | | 726/1 |
| 2014/0115578 A1* | 4/2014 | Cooper | G06F 21/606 |
| | | | 718/1 |
| 2015/0288710 A1* | 10/2015 | Zeitlin | G06F 21/554 |
| | | | 726/23 |
| 2016/0036833 A1 | 2/2016 | Ardeli et al. | |
| 2016/0088001 A1* | 3/2016 | Yeh | H04L 63/1416 |
| | | | 726/23 |
| 2016/0197951 A1 | 7/2016 | Lietz et al. | |
| 2016/0248798 A1 | 8/2016 | Cabrera et al. | |
| 2017/0142068 A1 | 5/2017 | Devarajan et al. | |
| 2017/0180402 A1* | 6/2017 | Finnig | G06F 21/563 |
| 2017/0230389 A1 | 8/2017 | Cochenour | |
| 2018/0004948 A1 | 1/2018 | Martin et al. | |

OTHER PUBLICATIONS

International Search Report and Written Opinion for Application No. PCT/US2018/014870, dated Apr. 4, 2018, 14 pages.

Tupakula U., et al., "Intrusion Detection Techniques for Infrastructure as a Service Cloud," 2011 IEEE Ninth International Conference on Dependable, Autonomic and Secure Computing (DASA), Dec. 12, 2011, pp. 744-751.

Non-Final Office Action from U.S. Appl. No. 15/413,304, dated Oct. 3, 2018, 19 pages.

Final Office Action from U.S. Appl. No. 15/413,304, dated Mar. 13, 2019, 26 pages.

* cited by examiner

GENERATING EFFICIENT COMPUTER SECURITY THREAT SIGNATURE LIBRARIES

TECHNICAL FIELD

Embodiments relate generally to computer network security. More specifically, embodiments relate to techniques for optimizing security threat signature libraries used by computer security applications to detect potential threats to computing devices and computer networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

A majority of businesses and other organizations today rely on computer systems and networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, etc.

Existing security applications often rely on security threat libraries to detect potential occurrences of computing device and network security threats. These threat libraries often contain a comprehensive set of security threat signatures that can be used to identify a wide range of known security threats. At a high level, a threat signature typically includes a pattern against which computer and network activity can be compared to identify potential occurrences of malware, viruses, network intrusion attempts, and other types of security threats. For example, network traffic, log data, and other computer-related activity can be analyzed using regular expression matching or other techniques to compare the activity against a library of security threat signatures, and to flag particular activity when one or more security threat signatures are matched.

Many existing security applications aggregate computer security threat libraries to enable detecting as wide of a range of security threats as possible. However, as the number of security threat signatures associated with these libraries increases, so too does the computational complexity of checking a potentially vast amount of network traffic and other computer activity-related data for the existence of data matching one or more of the signatures. Furthermore, many signatures of a comprehensive signature library might not be not relevant to all types of computing devices and computing environments.

DETAILED DESCRIPTION

Figure 1:
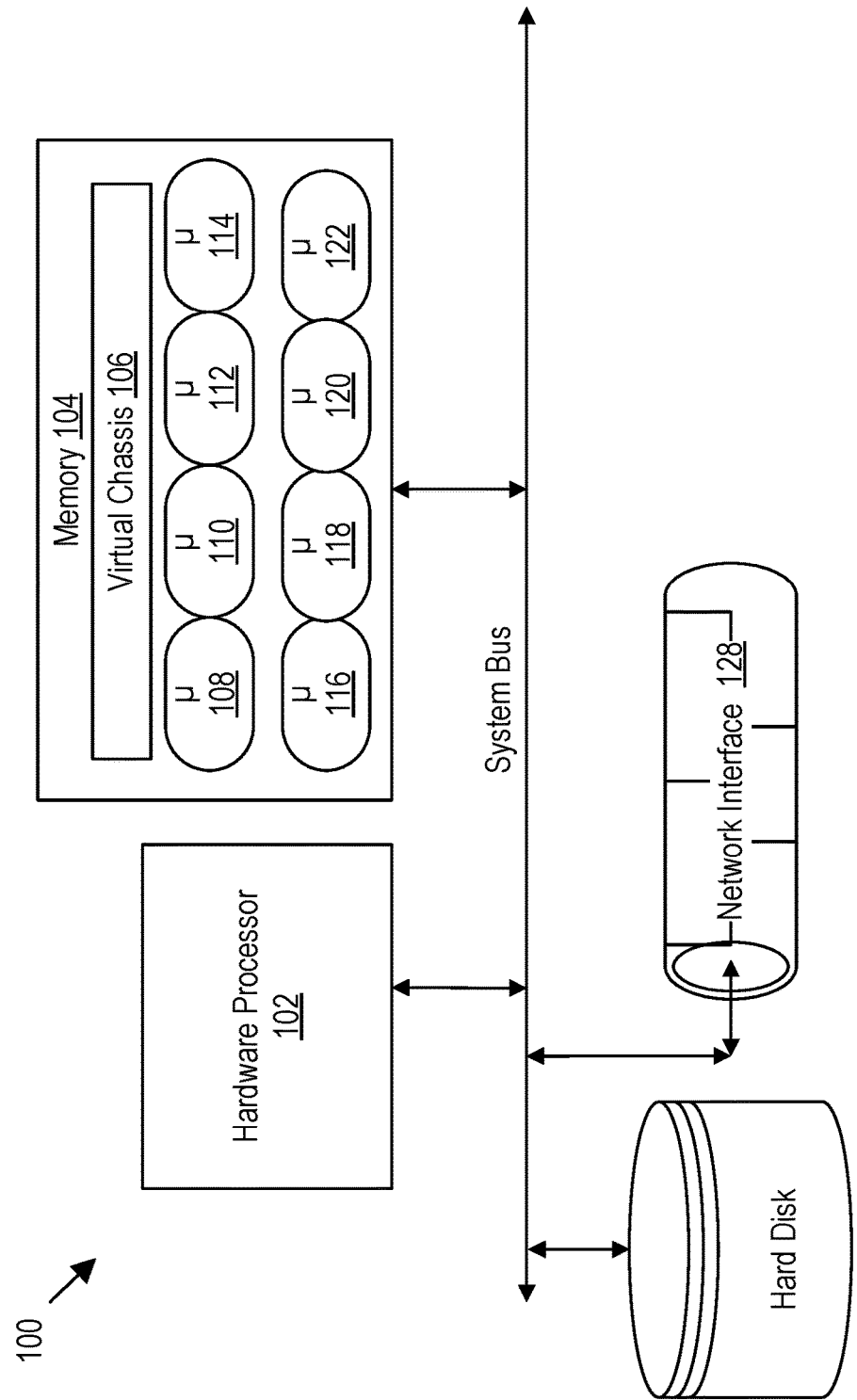
FIG. 1 is a block diagram illustrating computer hardware for loading network security system microservices from a memory and executing them by a processor in accordance with the disclosed embodiments.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form to avoid unnecessarily obscuring embodiments of the present invention.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments are described herein according to the following outline:

1.0. General Overview
2.0. Operating Environment
   2.1. System Overview
   2.2. Security Orchestration Overview
   2.3. Device Profile Information Collection
   2.4. Security Policy Definitions
   2.5. Example Security Orchestration System
3.0. Functional Overview
   3.1. Generating Optimized Signature Libraries
   3.2. Updating Signature Libraries
4.0. Example Embodiments
5.0. Implementation Mechanism—Hardware Overview
6.0. Extensions and Alternatives
1.0. General Overview Modern data centers and other computing environments can include anywhere from a few computer systems to thousands of systems configured to process data, service requests from remote clients and other applications, and perform numerous other computational tasks. The large number of interworking systems, applications, etc., make such computing environments susceptible to a wide variety of network security threats and other issues. A number of network security tools are available to protect such systems and the computer networks interconnecting these systems, and many of these tools comprise a monolithic set of network security functions. For example, a typical network security tool might comprise a hardware unit including firewall services, routing services, virtual private network (VPN) services, and so forth.

The type of network security tool described above is useful for providing a variety of network security functions as a single unit. However, efficiently scaling these types of network security tools is often challenging. For example, if a particular computer environment might benefit from increased firewall resources, a system administrator may install one or more additional hardware units each including firewall services in addition to a suite of other network security functions. While the addition of these new hardware units may meet the increased firewall resource needs, some of the hardware units may include unnecessary or underutilized resources devoted to virtual private network (VPN) services, data loss prevention (DLP) services, or other security services.

One way in which many modern computing environments scale resources more efficiently is using virtualized computing resources. A virtualized computing resource generally refers to an abstracted physical computing resource presented to an operating system and its applications by means of a hypervisor, such that the virtual computing resources (compute, memory, network connectivity, storage, etc.) are configurable and may be different from those of the physical computing resource. According to one embodiment, these types of virtualized infrastructures are used to efficiently scale network security applications based on the use of "microservices," where a microservice is a particular type of virtualized computing resource packaged as a software container. For example, a network security platform may comprise separate microservices providing firewall resources, DLP services, VPN services, etc. In general, the use of such microservices can provide greater flexibility because the microservices can be more easily deployed and scaled in response to variable demands for various types of network security services.

The type of efficient network security application scaling described above can be achieved with the use of a security application that is configured to scale network security services using microservices. Although many of the techniques described herein are explained with reference to a microservice-based network security application, the techniques are also applicable to other types of network security systems.

2.0. Operating Environment
   2.1. System Overview

FIG. 1 is a block diagram illustrating an embodiment of a scalable microservice architecture using microservices. Network security system microservices 108-122 are stored in memory 104 (e.g., volatile memory such as Random Access Memory (RAM) or non-volatile memory such as disk) and executed by one or more hardware processors or processor cores 102. Network security system microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, a network security system 100 utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices stored in memory 104. A network interface 128 (e.g., fabric or interconnect that is wired or wireless) provides a means for communicating with a data center. Network security system 100 may inspect traffic, detect threats, and otherwise protects a data center using the microservices 108-122.

Embodiments of a network security system 100 providing the above capabilities are now discussed in more detail. Network security system 100 adds security to, or enhances the security of, a datacenter or other computing environment. In an embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, a network security system 100 utilizes a network interface 128 to explore the datacenter and to discover existing network segments, determine security settings to apply to various network segments, detect available hosts and hardware resources, and determine additional configuration information as needed. In an embodiment, the datacenter itself includes several machines with hypervisors, or physical hardware, and the network security system 100 offers microservices to communicate with and protect one or more of those internal virtual machines or physical hardware. Based on performing datacenter discovery, a network security system 100, in some embodiments, may then offer or suggest available security tools for selection either through a graphical interface or via connections with existing enterprise management software. In one embodiment, once configured, a network security system 100 is deployed "in-line," receiving packets headed for the datacenter, thereby allowing network security system to intercept and block suspicious traffic before it reaches the datacenter. With an understanding of the datacenter, a network security system 100 deploys microservices to inspect traffic throughout the datacenter, and not only at ingress. In some embodiments, a network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which is also a microservice. In an embodiment, the microservices are small in size, consisting of a relatively small number of instructions. In an embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

In an embodiment, a network security system 100 receives traffic via network interface 128 to/from a datacenter. In one embodiment, a network security system 100 is placed in-line to inspect traffic, and potentially intercept a threat before it arrives at, or leaves, the datacenter. In other embodiments, a network security system 100 monitors the traffic heading into, or out of, the datacenter, in which case the network security system 100 detects threats and generates alerts, but does not block the data. A hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In an embodiment, microservices 108-122 are implemented using computer-executable instructions loaded from the Internet via network interface 128. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, a network security system 100 runs on a datacenter computer. In other embodiments, however, a network security system 100 is installed and runs on any one of a wide variety of computing platforms, ranging from low-cost to high-cost, and from low-power to high power. In some embodiments, a network security system 100 runs on a server. In some embodiments, a network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, a network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs, memory, or both, are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
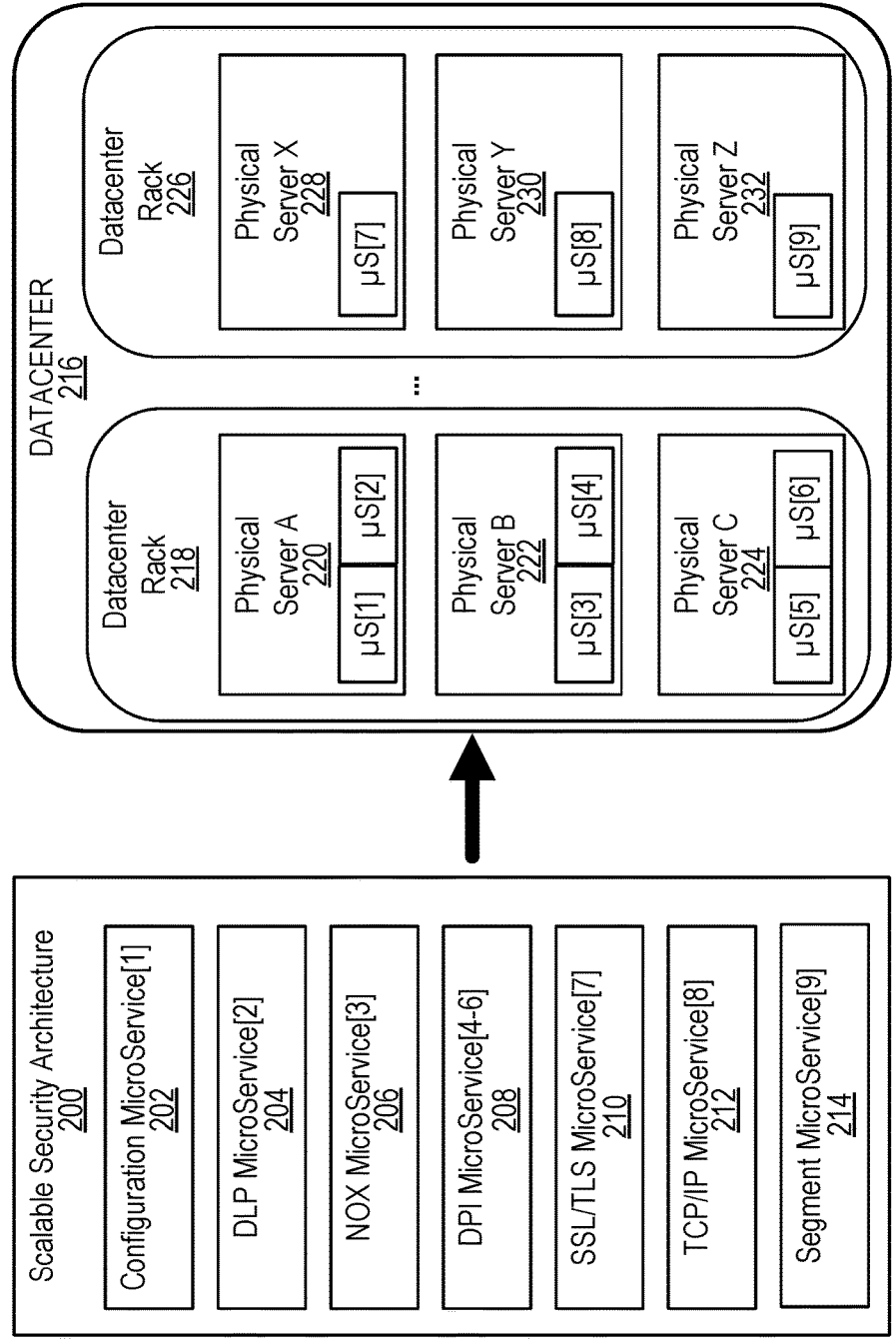
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

Figure 3:
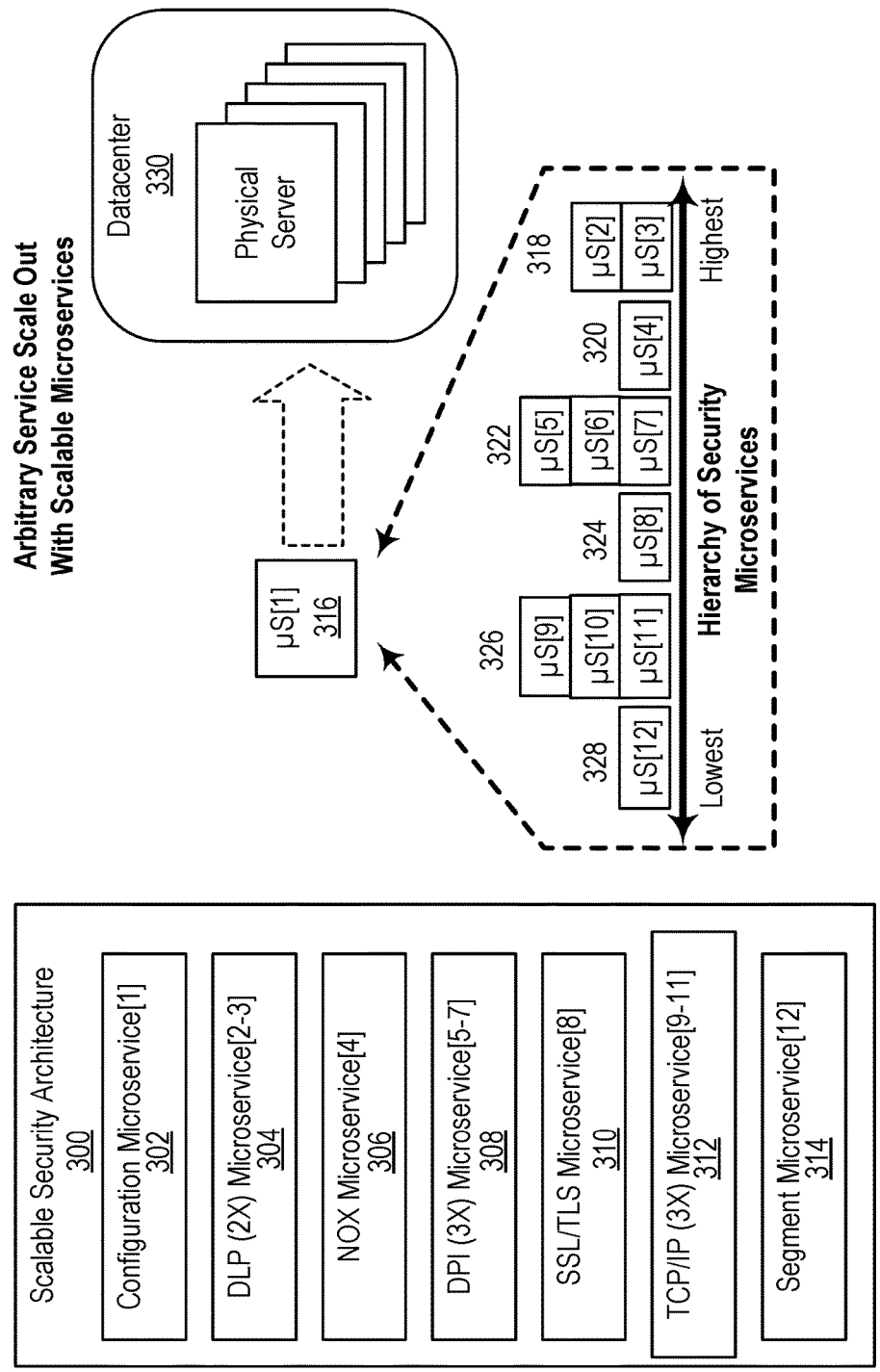
FIG. 3 illustrates an arbitrary scaling out of a microservice in accordance with the disclosed embodiments.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy, and configures them to communicate with each other via a backplane. The microservices, for example, may be implemented by physical servers in datacenter 330.

Figure 4:
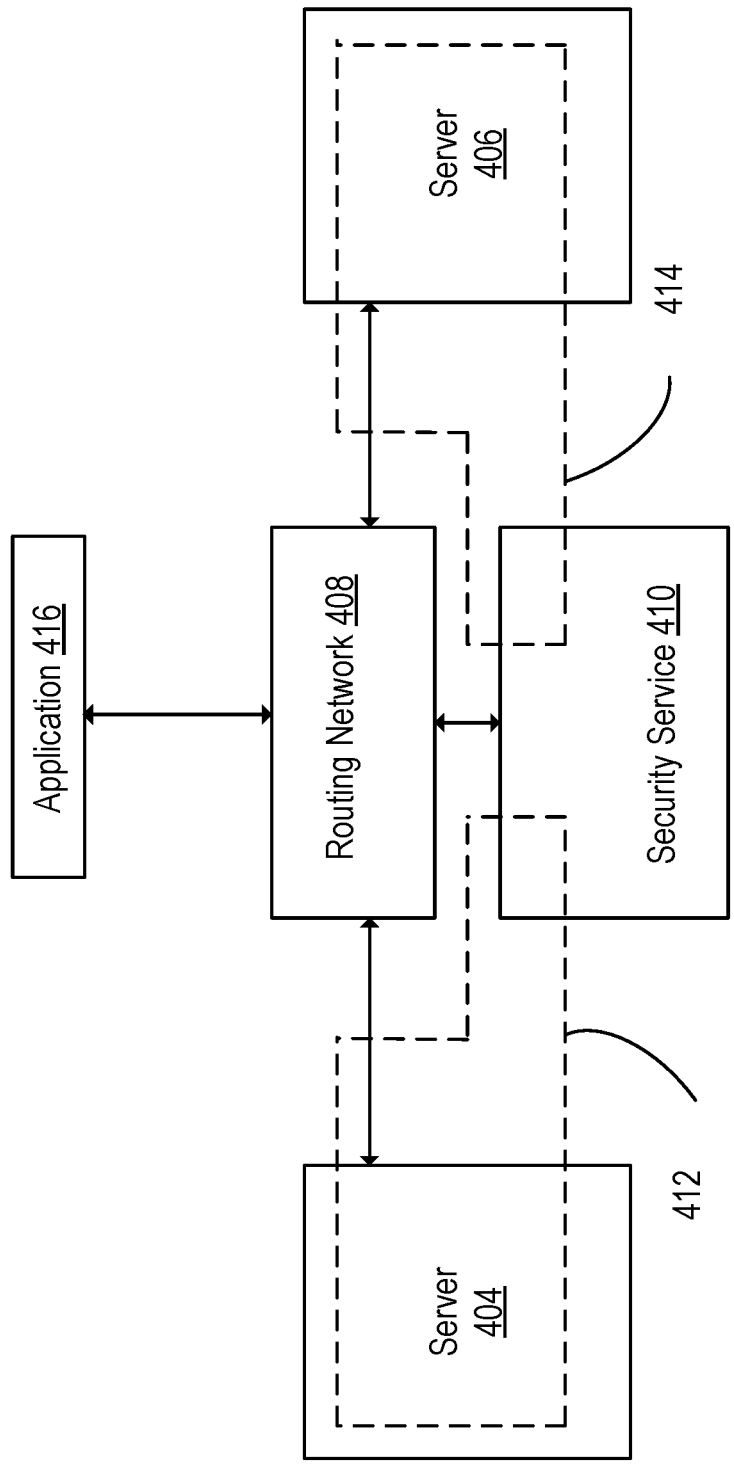
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between an application 416 and one or more servers 404, 406 through a routing network 408. The security service 410 comprises one or more "microservices" used to monitor and perform various actions relative to data items (e.g. network traffic, files, email messages, etc.) sent to and received from one or more applications 416 and servers 404, 406. The microservices comprising security service 410 may not be confined to one physical server such as a server 404, 406. For example, one or more microservices of the security service 410 may be executed on server 404, and other microservices of the security service 410 may be executed on server 406. In some embodiments, the security service 410 is executed on a different server from one or more servers for which the security service is responsible for monitoring and protecting.

In an embodiment, a routing network 408 provides connectivity among servers 404, 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
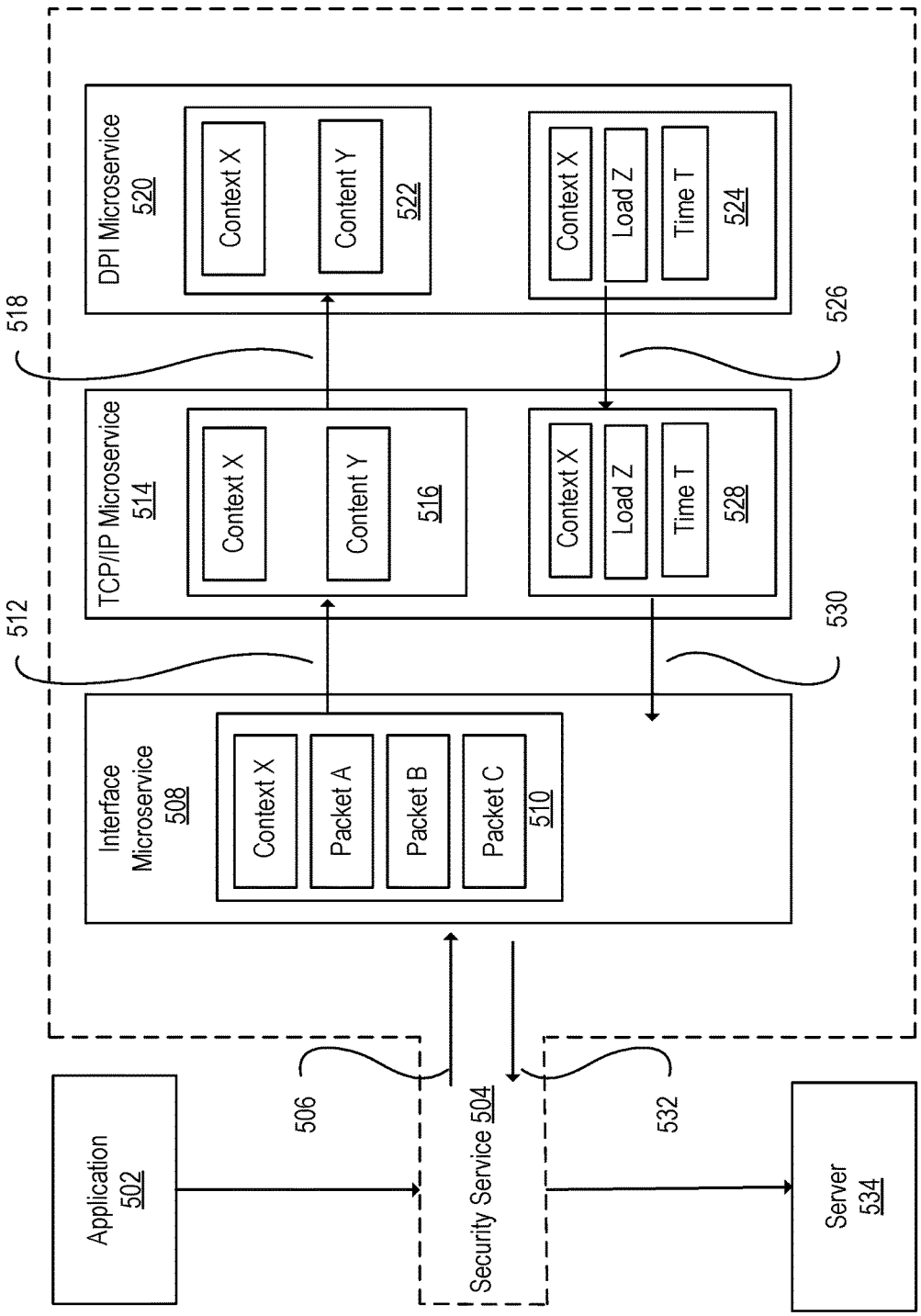
FIG. 5 is a block flow diagram illustrating application data traversing to a server after passing through a hierarchy of a security microservices in accordance with the disclosed embodiments.

FIG. 5 is a block flow diagram illustrating application data traversing to a server after passing through a hierarchy of a security microservices according to an embodiment. As illustrated, the flow begins with security service 504 receiving a network data packet from application 502. Security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service), or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 524, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via paths 526 and 530, the microservices receive and can maintain real-time loading and processing latency information utilized to make load balancing decisions.

Figure 6:
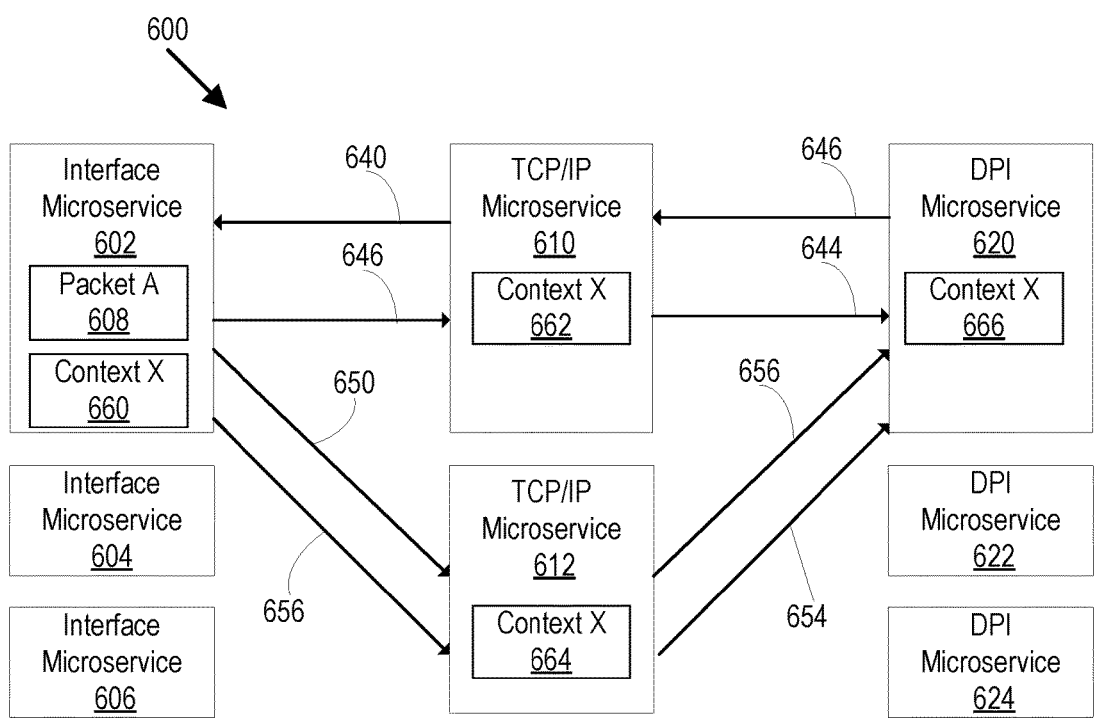
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security system 600 includes interface microservices 602, 604, and 606, TCP/IP microservices 610 and 612, and DPI microservices 620, 622, and 624. Other examples include a different number of microservices, different types microservice types, or both. In the example of FIG. 6, an interface microservice 602 receives packet A 608, and generates a context X 660.

One benefit of the security system illustrated in FIG. 6 is the handling of state. For example, if packets belong to a certain context X, the security system 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission 646. Context X 662, when transmitted to DPI microservice 620 as part of transmission 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and also a state lookup or a context lookup, in addition to other information. Interface microservice 602 provides packet A 608 and context X 660 to TCP/IP microservice 610 or 612 via path 646 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data or the data resulting from the security processing to DPI microservice 620 via paths 644 or 656, respectively. Along with the transmitted data, TCP/IP microservice 610 or 612 forwards context X 662 or 664, respectively, to a DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via path 650. TCP/IP microservice 612 performs some security processing, then transmits the second packet and context X 664 to DPI microservice 620 via path 654. After performing some security processing, DPI microservice 620 responds to TCP/IP microservice 612 via path 654, and TCP/IP microservice responds to interface microservice 602 via path 656.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

2.2. Security Orchestration Overview

According to embodiments described herein, a security orchestration system optimizes computer security threat and signature libraries used by a computer security application to provide security services (e.g., deep packet inspection (DPI) services, data loss prevention (DLP) services, etc.) to one or more computing devices and computer networks. In one embodiment, a computer security threat library includes a set of computer security threat definitions, wherein each threat definition relates to a potential security threat to a computing device, computer network, the data stored on devices or traversing the network, or some combination thereof. For example, a threat library might include definitions relating to various types of viruses, malware, phishing attacks, network intrusion methods, and other potential security threats. Threat libraries may also be customized to protect data or be constructed to be data-aware, such that security policies may be applied to devices or networks based at least in part on the data stored on those devices or traversing those networks.

In one embodiment, some or all of the threat definitions of a threat library are associated with at least one security threat signature. A security threat signature generally refers to one or more patterns or other data that can be used to identify potential instances of an associated security threat. For example, one security threat signature might define a pattern identifying network traffic potentially corresponding to a denial-of-service (DoS) attack. Another example threat signature might define a pattern used to identify email messages potentially corresponding to a known type of phishing attack. A security application can use threat and signature libraries to detect instances of potential security threats by comparing computer-related activity (e.g., network traffic, log data, etc.) against the signatures and associated threats in the libraries. Threat signatures may be indicative of multiple security threats, and multiple threat signatures may together or in some combination be indicative of a security threat.

As described in more detail in Section 3.0, in an embodiment, a security orchestration system optimizes a threat signature library by generating computing device-specific and security application-specific threat signature subsets of a comprehensive signature library. For example, in one embodiment, a security orchestration system generates an optimized threat signature library containing a subset of an initial comprehensive, or global, threat signature library based at least in part on attributes of one or more computing devices (e.g., a type and version of hypervisor running on the computing device, types and versions of virtual machines (VMs) running on the hypervisors, applications running on the computing device, users associated with the computing device, etc.) for which the optimized threat signature library is to be used. An optimized threat signature library may further include signatures relating to types of activity particular to those computing device(s) (e.g., types of network traffic, protocols used, types of content contained the network traffic, etc.). In an embodiment, a security orchestration system further optimizes a threat signature library for particular security application services (e.g., by generating one set of threat signatures relevant to a DPI service, and generating a separate set of threat signatures relevant to a DLP service).

As indicated above, one aspect of generating an optimized threat signature library can include selecting those signatures from a comprehensive library of signatures which are relevant to one or more computing devices to which security services are to be provided. In one embodiment, to determine which signatures from a global threat signature library are relevant to a particular computing device, a security orchestration system uses various probes to generate a profile of a computing device.

Figure 7:
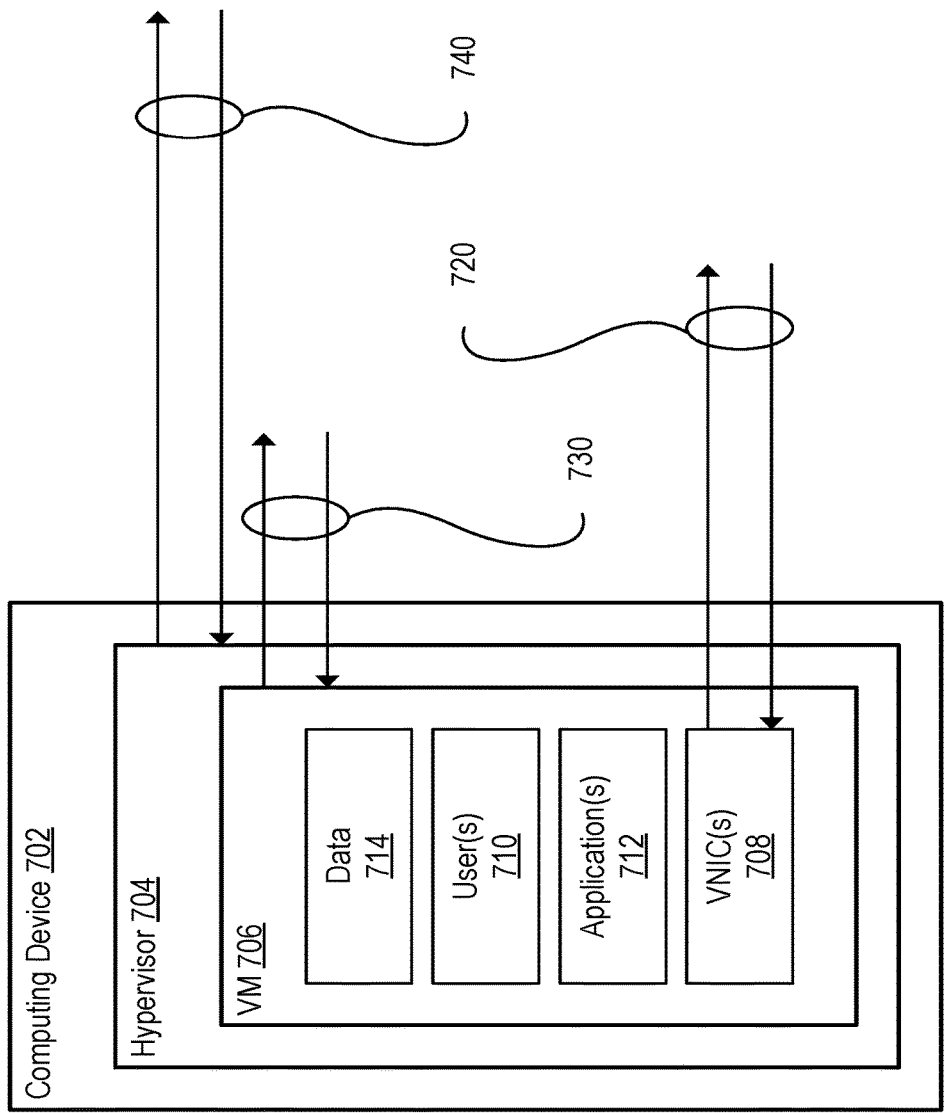
FIG. 7 is a block diagram illustrating example aspects of a host computing system which can be used to generate a profile of the host computing system in accordance with the disclosed embodiments.

FIG. 7 illustrates example components of a computing device 702 for which a security orchestration system can generate a device profile. In one embodiment, a computing device 702 broadly is any type of physical computing device such as, for example, a server, a workstation, a laptop, a tablet, a mobile device, gaming system, set-top box, and so forth. In the example of FIG. 7, at least one hypervisor 704 is running on the computing device 702, and at least one virtual machine (VM) 706 is running on the hypervisor 704. Although the example computing device 702 of FIG. 7 includes one hypervisor and one VM, in general, a computing device 702 might include any number of hypervisors, each hypervisor hosting any number of VMs.

In an embodiment, a computing device 702 is associated with various operational "dimensions" potentially relevant to providing security services to the computing device 702. For example, FIG. 7 illustrates dimensions including application(s) 712 (e.g., including any type of application software running on a VM 706 or a hypervisor 704), user(s) 710 (e.g., including any users having local or remote access to a VM 706 or to any of applications 712), data 714 (e.g., including any data stored by or accessible to a VM 706), and virtual network interface card(s) (VNICs) 708 (e.g., enabling VM 706 and applications 712 to access computer networks). These operational dimensions generally interact with other computing devices and networks in various ways. For example, an accounting user from users 710 using a computing device 702 might use an accounting application from applications 712 to process financial data from data 714, the result of which is communicated to other networked computing devices via a VNIC 708 (e.g., for storage in a remote database). Threats to the security of computing device 702 can be viewed as being targeted towards a physical computing device 702, the hypervisor 704 on computing device 702, the virtual machines (e.g., VM 706 and other virtual machines not shown) and the users 710, data 714 and applications 712 transporting data on or interactive with the network environment through VNICs 708.

In an embodiment, some security threats to a computing device 702 can be characterized based on some or all of these dimensions. For example, one type of security threat might correspond to a VM or application having an unusual number of users authenticated at the same time. Other example types of security threats might relate to understanding which users are associated with various applications (e.g., some users might not have permission to access certain applications), relate to types of data to which particular users have access, how particular types of network traffic are treated, and so forth. These represent variables to be considered, for example, when a security policy is applied to network traffic sent and received by the VM 706 via VNIC 708.

In an embodiment, at least three interfaces of a computing device 702 can be examined to generate profile information for the computing device. As illustrated in FIG. 7, as one example, some characteristics of a computing device 702 can be examined by analyzing network traffic 720 sent or received by the computing device 702 via a VNIC 708. As another example, some characteristics of a computing device 702 can be examined by analyzing (e.g., by sending application programming interface (API) requests 730) the attributes and operation of a VM 706 running on the computing device 702. As yet another example, some characteristics of a computing device 702 can be examined by analyzing (e.g., by sending API requests 740) the attributes and operation of hypervisor 704.

2.3. Device Profile Information Collection

Figure 8:
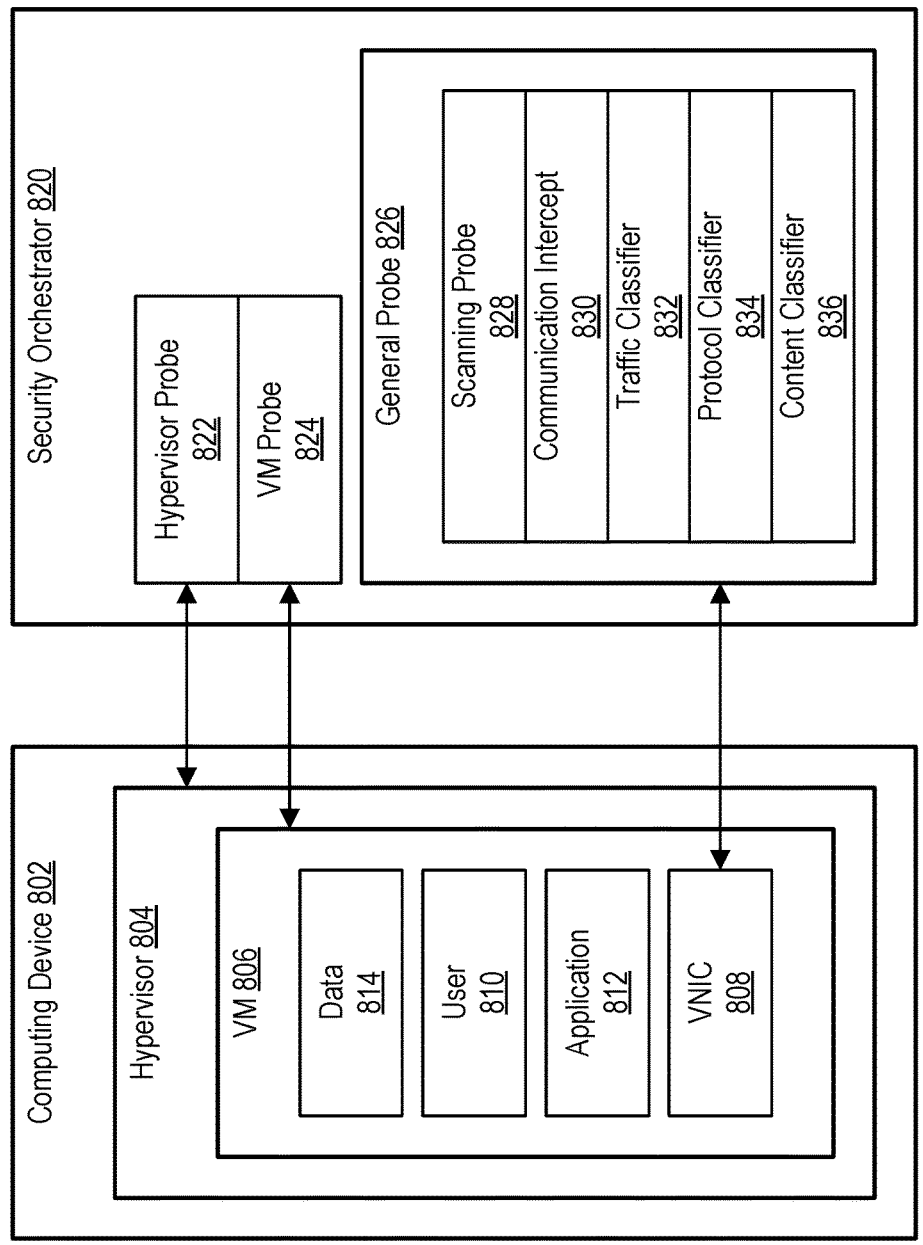
FIG. 8 is a block diagram illustrating an example of using probes to collect profile information related to the activity of a host computing device in accordance with the disclosed embodiments.

FIG. 8 depicts an example of a security orchestrator including various probes used to collect profile information for a computing device. In the example of FIG. 8, a security orchestrator 820 includes a hypervisor probe 822 (e.g., used to collect information relating to a hypervisor 804), a VM probe 824 (e.g., used to collect information relating to a VM 806), and a general probe 826 (e.g., used to collect other types of device profile information based on monitoring network traffic sent and received by a VNIC 808). As used herein, a probe generally refers to any process (e.g., an application, API, script, etc.) for obtaining profile information related to a computing device.

In an embodiment, one aspect of collecting profile information for a computing device 802 includes actively probing the device for information. For example, a security orchestrator 820 might use an API or other programmatic interface to request and receive information from one or more components of a computing device 802. As depicted in FIG. 8, for example, hypervisor probe 822 and VM probe 824 might use APIs to collect information related to a hypervisor 804 running on computing device 802 (e.g., a hypervisor type, a hypervisor version, status information, number and type of active VMs running on the hypervisor, etc.), VMs 806 running on a hypervisor 804, one or more applications 812 (e.g., application names, application types, application permissions, etc.), one or more types of data 814 (e.g., data types, data permissions, data size, data storage locations, etc.), one or more users 810 (e.g., user names, user roles, user permissions, user account status, etc.), and other information via network traffic sent from or received by a VNIC 808.

In an embodiment, a security orchestrator 820 further comprises a general probe 826, including various components for collecting device profile information such as a scanning probe 828, a communication intercept 830, a traffic classifier 832, a protocol classifier 834, and a content classifier 836.

In an embodiment, a scanning probe 828 can perform various scans (e.g., port scans, TCP scans, SYN scans, etc.) of a computing device 802. For example, a port scan of a computing device 802 might identify open ports, thereby enabling generation of profile information identifying types of services running on the computing device associated with the open ports.

In an embodiment, a communication intercept 830 intercepts and enables monitoring of network traffic sent and received by a VNIC 808. A communication intercept 830 can be used, for example, by various types of classifiers described below. Examples of mechanisms which a communication intercept 830 can use to monitor the network traffic sent and received by a VNIC 808 include, but are not limited to, creating a mirror port, assigning all traffic associated with the VNIC 808 to a trunk port, or any other methods for intercepting or monitoring the traffic.

In an embodiment, access to network traffic sent and received by a VNIC 808 enables a security orchestrator 820 to perform additional classification using a traffic classifier 832, a protocol classifier 834, and a content classifier 836. Use of the various classifiers may follow a hierarchical process. For example, a traffic classifier 832 can be used to identify types of network traffic sent and received by a VNIC 808 (e.g., to identify IP ports and IP ranges used by the computing device 802), a protocol classifier can be used to identify types of protocols used in the network traffic identified by the traffic classifier 832 (e.g., to determine that the Hypertext Transfer Protocol (HTTP) protocol is used in the network traffic, how much of the network traffic is used by certain protocols, whether network traffic encrypted, etc.), and a content classifier can identify types of content carried by the various types of identified protocols (e.g., to identify types of services and applications used by the computing device).

2.4. Security Policy Definitions

Figure 9:
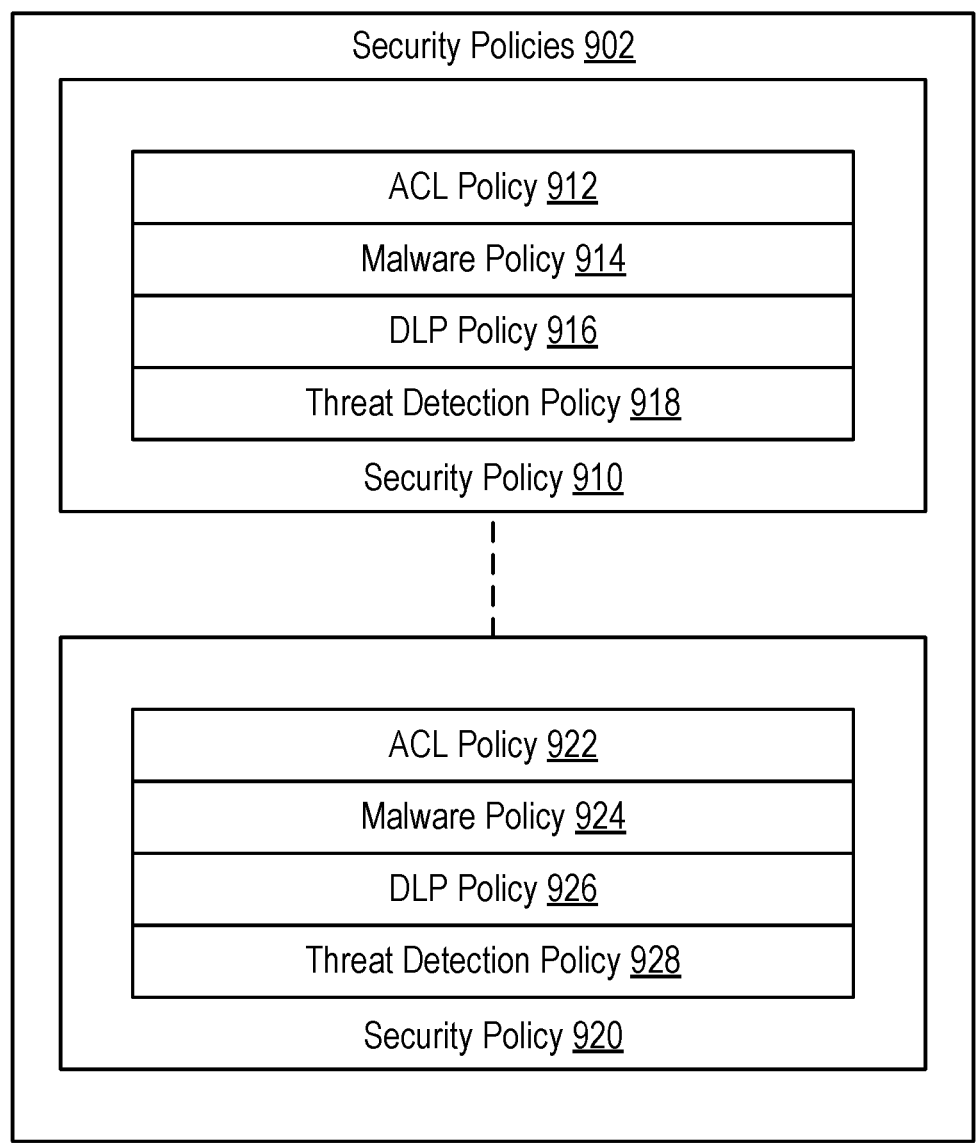
FIG. 9 is a block diagram illustrating an example set of security policies in accordance with the disclosed embodiments.

As described above, a security application generally provides security services to computing devices and networks. In one embodiment, a security application provides security services based at least in part on security policy profiles. At a high level, a security policy profile defines a set of security-related rules and policies to be applied to one or more computing devices, networks, or both. FIG. 9 illustrates an example set of security policies 902, and component policies thereof, which may can be used to define how a security application provides various types of security services. In the example of FIG. 9, a security policy (e.g., security policy 910) includes component policies including an access control list (ACL) policy 912, a malware policy 914, a data leakage protection (DLP) policy 916, and a threat detection policy 918. A different security policy 920 also includes an ACL policy 922, malware policy 924, DLP policy 926, and a threat detection policy 928. The example component policies in FIG. 9 are provided for illustrative purposes only; other security policies may include a different set of component policies, and different security policies within a set of security policies may contain different types of component security policies.

In an embodiment, an ACL policy includes a set of permissions related to network activity, file access, or other components of a computing device 802. For example, an ACL policy might include a rule indicating that the computing device 802 can communicate only with other networked devices having a set of specified IP addresses. As another example, an ACL policy might include a rule indicating which users 810 have access to particular data 814 stored at the computing device 802.

In an embodiment, a malware policy includes rules specifying how a computing device detects and protects against instances of malware. Rules included in a malware policy might include, for example, a rule specifying a latest version of anti-malware software, a rule to disable JavaScript on the computing device, and so forth.

In an embodiment, a DLP policy identifies types of content and rules either permitting or restricting particular types of content from traversing a computing device. Furthermore, for types of data which are permitted to traverse the device, a DLP policy can identify locations the data is permitted to traverse. Example rules included in a DLP policy might indicate that certain types of content (e.g., data marked "confidential") are not permitted to leave a local area network, indicate that other types of data can only traverse a data center at which the computing device is located, indicate that other types of data can traverse only a specified range of IP address, and so forth.

In an embodiment, a threat detection policy 928 indicates an expected response of a security application when detecting threats based on specific policies (e.g., an ACL policy, malware policy, or DLP policy). For example, a threat detection policy 918 might instruct a security application to monitor network traffic for malware activity and to actively deny traffic associated with any threat identified in the malware policy. As another example, a threat detection policy 918 might instead instruct a security application to monitor network traffic passively and to generate alerts when threats are detected, rather than automatically denying the traffic.

2.5. Security Orchestration System

Figure 10:
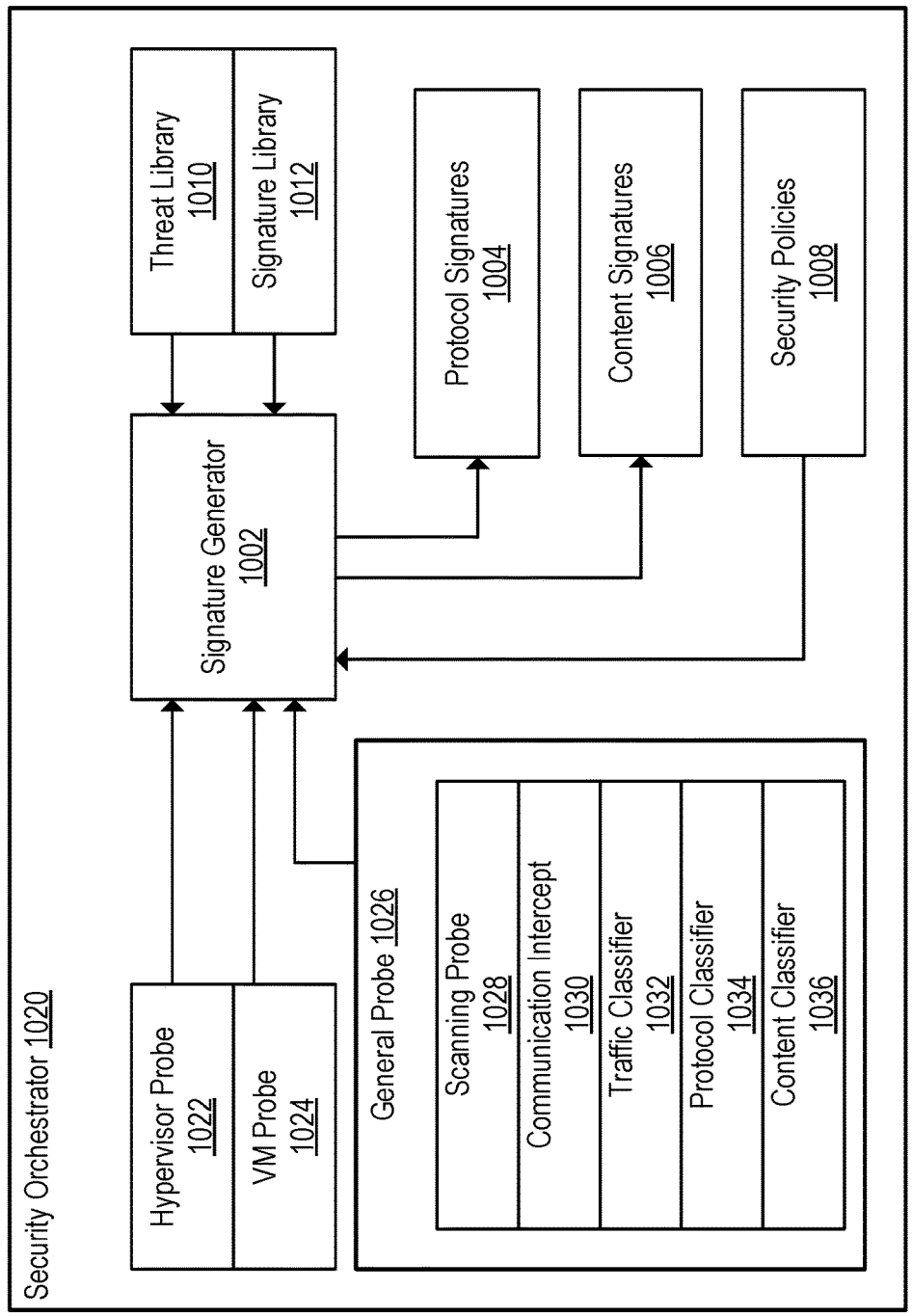
FIG. 10 is a block diagram illustrating an example security orchestration system, including a signature generator component for generating optimized threat signature libraries in accordance with the disclosed embodiments.

FIG. 10 illustrates an example system for generating optimized libraries of threat signatures for a computing device based on profile information collected about the computing device, and further generated based on one or more security policies to be applied to the computing device. In an embodiment, a security orchestrator 1020 includes a signature generator 1002, which generates an optimized set of protocol signatures 1004 and content signatures 1006 based on data collected by probes 1022, 1024, and 1026, and further based on security policies 1008.

In an embodiment, a threat library 1010 and a signature library 1012 include an initial comprehensive, or global, set of computer security threat definitions and corresponding computer security threat signatures, respectively. As described above, a security threat definition from a threat library 1010 defines one or more rules related to a potential security threat, where each threat definition may be associated with one or more threat signatures of a signature library 1012, which can be used to identify instances of the associated security threat. For example, a security threat relating to a known type of phishing attack might be associated with one or more signatures from the signature library 1012 identifying email messages, types of network traffic, or other indications of the phishing attack.

In an embodiment, security policies 1008 include one or more security policies to be applied to a computing device for which the optimized set of threat signatures is being generated. For example, FIG. 9 illustrates examples of security policies 920, where each security policy of security policies 1008 can include possibly several component policies.

As described in more detail in Section 3.0, in one embodiment, a signature generator 1002 generates, based on an initial threat library 1010 and signature library 1012, an optimized set of protocol signatures 1004, content signatures 1006, or both. The signature generator 1002 generates the optimized set of protocol signatures 1004 and content signatures 1006 using data collected from probes 1022, 1024, and 1026 (e.g., including data collected by a scanning probe 1028, a communication intercept 1030, a traffic classifier 1032, a protocol classifier 1034, and a content classifier 1036), and further based on one or more security policies 1008 to be applied to the computing device.

3.0. Functional Overview

Approaches, techniques, and mechanisms are disclosed to optimize a size of computer threat signature libraries used by computer security applications to detect potential occurrences of security threats. In an embodiment, a threat signature is a pattern used by a computer security application to detect instances of potential security threats. A threat signature library is a collection of individual threat signatures, where a signature library can be used in conjunction with a threat library to enable detection of a range of threats to computing devices and networks (e.g., various types of viruses, malware, spam, network-based attacks, etc.).

In an embodiment, a security orchestrator collects, using various types of probes, profile information relating a computing device to which security services are to be provided. For example, a security orchestrator might include probes used to collect information relating to hypervisors and VMs running on a computing device, network traffic sent and received by the computing device, stored data, users, applications, and any other aspects of the computing device.

In an embodiment, based on the profile information collected for one or more computing devices, the security orchestrator optimizes the size of a security threat signature library used to provide security services. For example, starting with a global set of security signatures, the security orchestrator might remove signatures determined to be irrelevant to a profiled computing device (e.g., because the signatures relate to applications, network protocols, or other components not applicable to the computing device). The security orchestrator can further add threat signatures to the optimized set which are relevant to one or more security policies to be applied to the computing device. As one example, a security policy to be applied to a computing device might include a rule restricting one type of network traffic and, thus, the security orchestrator can add signatures related to detecting the prohibited type of network traffic.

In an embodiment, a computer security application can use optimized security threat signature libraries by comparing computer and network-related activity against signatures in the optimized libraries using various pattern matching techniques. For example, DPI, DLP, and other security-related services can use the optimized threat signature libraries to detect potential instances of viruses, spam, network intrusion attempts, protocol non-compliance, etc. By optimizing a number of threat signatures included in signature libraries based on the characteristics of a computing device to which security services are to be provided, a security application can use smaller signature libraries to improve the performance and accuracy of detecting occurrences of potential security threats. Furthermore, an amount of storage used to store signature libraries can be reduced by removing signatures from a global library that are irrelevant to particular computing devices and environments.

In one embodiment, a security orchestrator 1020 performs operations to optimize threat signature libraries, for example, as part of a process of adding a new computing device to a network. In one example, a configuration microservice (e.g., a configuration microservice 202 as shown in FIG. 2) might include one or more components of a security orchestrator 1020. In other examples, a security orchestrator 1020 is a separate microservice of a security architecture 300, or can operate as a standalone application or process.

3.1. Generating Optimized Signature Libraries

Figure 11:
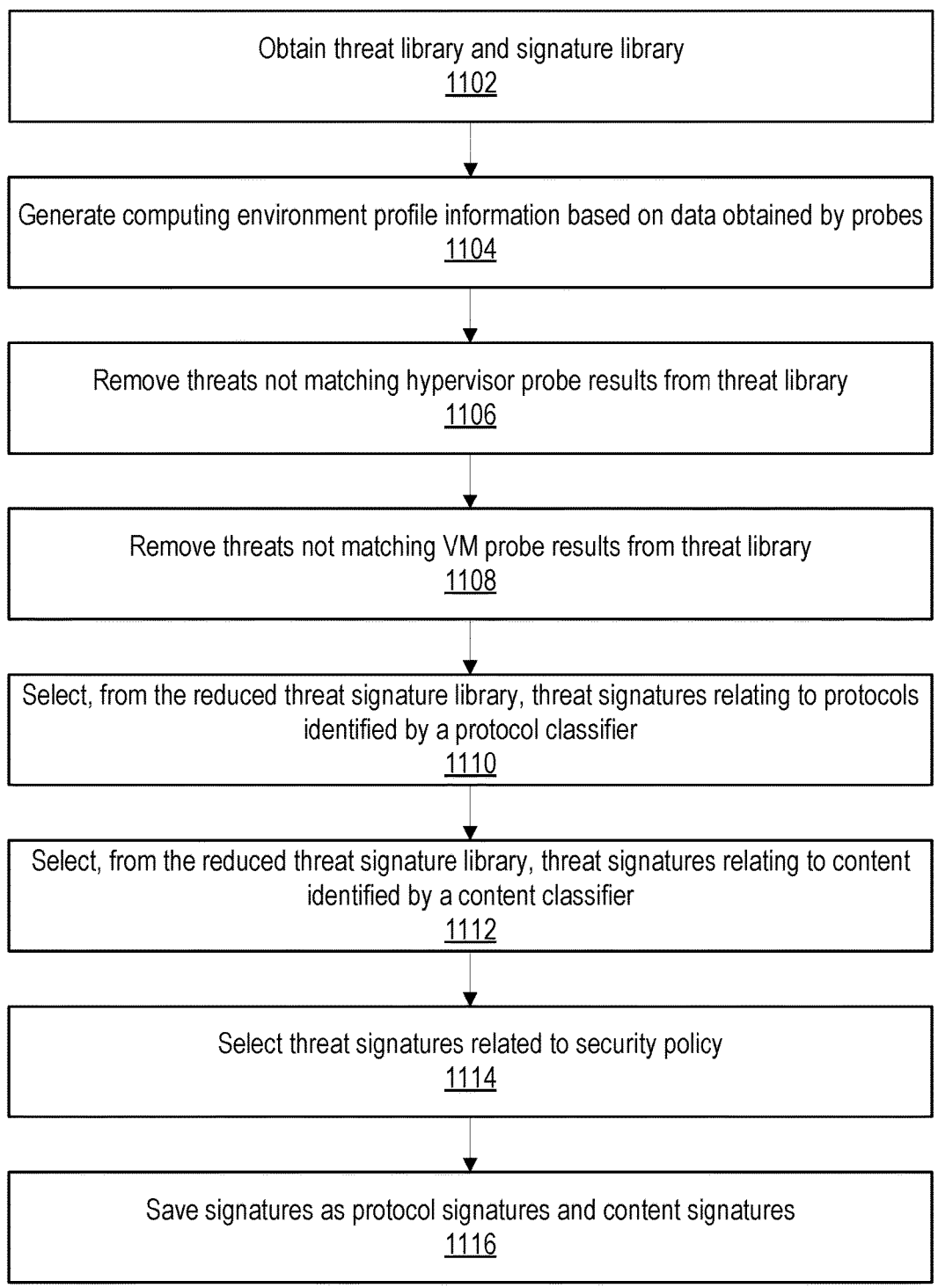
FIG. 11 is a flow diagram illustrating an example method for generating an optimized protocol signature library and a content signature library in accordance with the disclosed embodiments.

FIG. 11 illustrates an example computer-implemented method to generate optimized computer security threat signature libraries relative to a computing environment to which one or more security policies are to be applied, in accordance with the disclosed embodiments. In one embodiment, the method of FIG. 11 is performed by a security orchestrator 820, as illustrated in FIG. 8 and FIG. 10. In this context, a computing environment might refer to one or more computing devices (e.g., computing devices 702), VMs (e.g., VMs 706), or any combination thereof.

At block 1102, a security orchestrator obtains a computer security threat library and a computer security threat signature library. As described in reference to FIG. 10, for example, a threat library 1010 and a signature library 1012 initially obtained by a security orchestrator 1020 generally include a comprehensive, or global, set of computer security threat definitions and corresponding threat signatures. An obtained security threat library, for example, contains definitions of potential security threats (e.g., including timing rules, parameters, etc.), where each threat definition may be associated with one or more threat signatures from a threat signature library. In one embodiment, some or all of the threat definitions and threat signatures contained in the obtained threat library and signature library are included with a security orchestrator 1020. In some embodiments, some or all of the threat definition and threat signatures are obtained from a remote source and can be updated over time (e.g., by retrieving updated threat definitions and threat signatures from a remote database).

At block 1104, the security orchestrator generates profile information for a computing environment to which the one or more security policies are to be applied based on data obtained by one or more probes. For example, a security orchestrator 1020 can generate the profile information, including information obtained by a hypervisor probe 1022 relating to at least one hypervisor running on the computing environment, information obtained by a VM probe 1024 relating to at least one VM running on the at least one hypervisor, and information obtained by a general probe 1026 relating to network traffic and other aspects of the computing environment. As described in Section 2.3, the profile information might include information such as a type and version of hypervisors running on the computing, types and versions of VMs running on the hypervisors, application information, user information, information about data stored at the VMs, information about protocols, content, and other characteristics of network traffic sent and received by the VMs, and any other types of computing environment profile information.

At block 1106, the security orchestrator removes, from the threat library, security threat definitions which are not relevant to the hypervisor probe results. For example, some threat definitions of a threat library 1010 might relate to a type or version of hypervisor that is different from any hypervisor running on the computing environment. As another example, some threats of a threat library 1010 might relate to a hypervisor configuration that is not relevant to any hypervisor running on the computing environment. In an embodiment, threat definitions determined not to apply to any hypervisor running on the computing environment can be removed from the threat library. The threat definitions determined not to apply to any hypervisor running on the environment can be removed from a threat library 1010, or a separate threat library can be generated which excludes the threat definitions determined not to apply. In an embodiment, removing threats definitions from the threat library includes removing, from a threat signature library 1012, threat signatures associated with the removed threat definitions.

At block 1108, the security orchestrator removes, from the threat library, threats which are not relevant to the VM probe results. Similar to block 1106, some threat definitions of a threat library 1010 might relate to a type, version, or configuration of VM that is different from any VM running on the computing environment. In an embodiment, threat definitions determined not to apply to any VM running on the computing environment also can be removed from the threat library. As indicated above in block 1106, removing threat definitions from the threat library can include removing, from a threat signature library 1012, threat signatures associated with the removed threat definitions.

At block 1110, the security orchestrator selects, from the threat signature library reduced at blocks 1104 and 1106, threat signatures relating to protocols identified by a protocol classifier. For example, a protocol classifier 1034 of a general probe 1026 might identify one or more protocols (e.g., TCP, HTTP, SIP, etc.) used in network traffic sent or received by the computing environment. Based on the identified protocols, a security orchestrator 1020 can select signatures which relate to the identified protocols (e.g., to enable identification of threats relating to those identified protocols). In one embodiment, the selected threat signatures relating to protocols identified by the protocol classifier can be used to create protocol signatures 1004. Protocol signatures 1004, for example, can be used by a DPI or other security service that monitors protocol usage to detect potential security threats.

At block 1112, the security orchestrator selects, from the threat signature library reduced at blocks 1104 and 1106, threat signatures relating to content identified by a content classifier. For example, a content classifier 1036 of a general probe 1026 might identify one or more types of content sent, received, or stored by the computing environment (e.g., email messages, types of files, databases, etc.). Based on the identified types of content, a security orchestrator 1020 can select signatures which relate to the identified types of content. In one embodiment, the selected threat signatures relating to types of content identified by a content classifier 1036 can be used to create content signatures 1006. Content signatures 1006, for example, can be used by a DLP or other security service that monitors content to detect potential data breaches, data ex-filtration, or other content-based security threats.

At block 1114, the security orchestrator selects, from the initial signature library, threat signatures relating to one or more security policies to be applied to the computing environment. For example, in reference to FIG. 10, a security orchestrator 1020 selects threat signatures from signature library 1012 relating to one or more security policies 1008 to be applied to the computing environment. For example, a security policy from security policies 1008 might identify security rules which do not relate to any of the profile information obtained by a hypervisor probe 1022, VM probe 1024, or general probe 1026 (e.g., because the security rules relate to types of activity, network traffic, or content which has not yet occurred at the computing environment). Thus, if signatures were removed at block 1104 or block 1106 because the signatures did not relate to activity detected by the probes, the security orchestrator can add those signatures to optimized protocol signatures 1004 and content signatures 1006 so that the security policy can be applied appropriately.

At block 1116, the security orchestrator saves the signatures selected at blocks 1110-1114 as an optimized set of protocol signatures, content signatures, or both. For example, a security orchestrator 1020 can save the signatures selected at blocks 1108, 1110, and 1114 as protocol signatures 1004, and can save the signatures selected at blocks 1108, 1112, and 1114 as content signatures 1006. As described above, each of the separately saved signature sets can be used by various types of security services (e.g., a DPI service can use the protocol signatures 1004 and ignore the content signatures 1006, while a DLP service can use the content signatures 1006 and ignore the protocol signatures 1004). In other embodiments, the protocol signatures 1004 and content signatures 1006 can be stored together in a same library, or using any other groupings of signatures depending on types of security services to use the signatures.

3.2. Updating Signature Libraries

The example method described in relation to FIG. 11 illustrates a process for generating optimized signature libraries based on an initial global threat and signature library. In an embodiment, optimized signature libraries can be further optimized over time, for example, in response to computing environment changes (e.g., the addition or removal of hypervisors, VMs, applications, users, types of data, etc.), security policies changes (e.g., addition and removal of policies based on new types of known malware, phishing attacks, and other security threats), or both. For example, a security orchestrator 1020 might add particular signatures to optimized libraries based on detecting new applications, users, or content types, and might remove particular signatures from the libraries based on an update to the version of a hypervisor or VM running on the computing environment.

Figure 12:
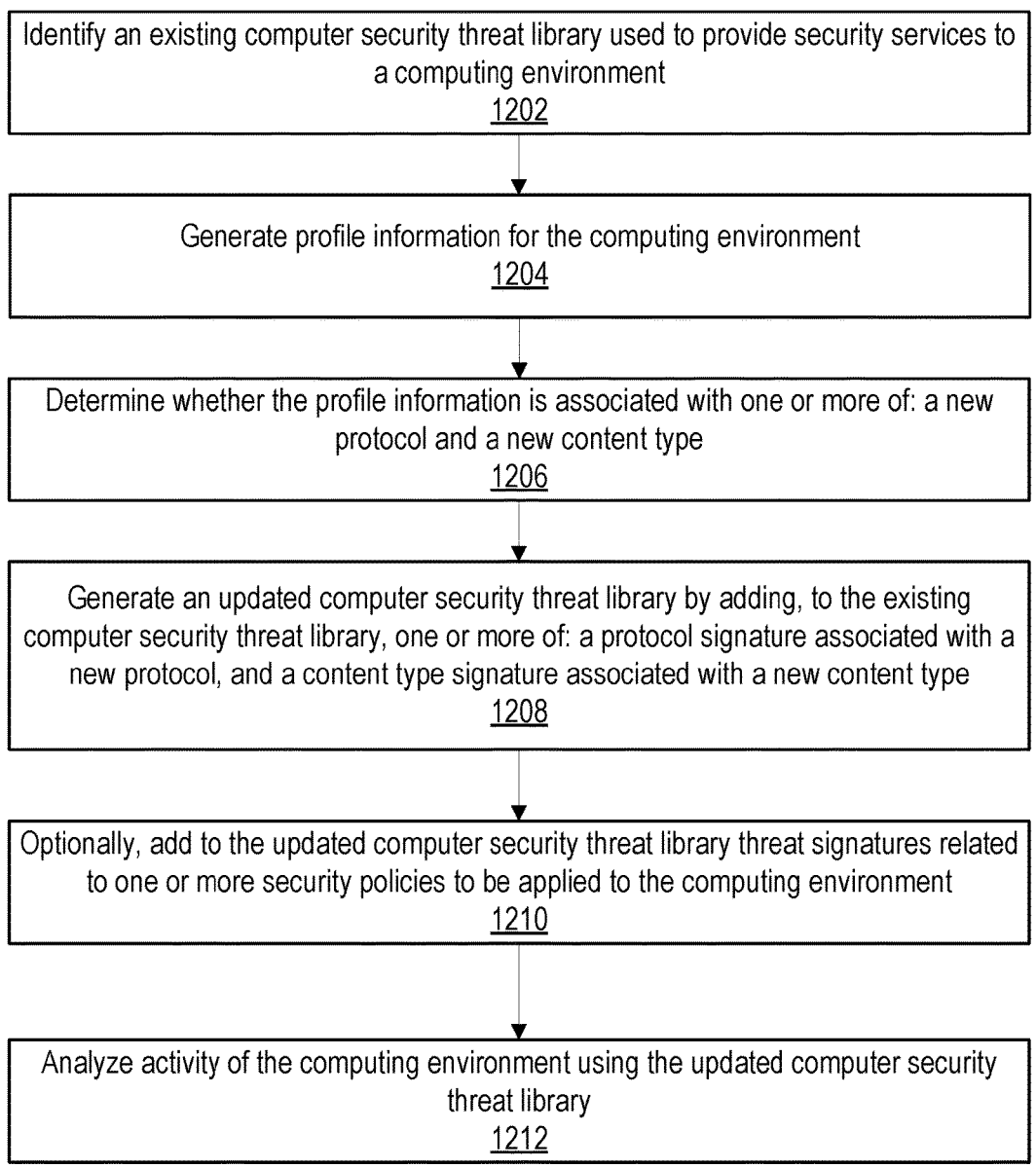
FIG. 12 is a flow diagram illustrating an example method for updating an optimized protocol signature library and a content signature library in accordance with the disclosed embodiments.

FIG. 12 illustrates an example computer-implemented method to update optimized computer security threat signature libraries relative to a computing environment to which one or more security policies are being applied, in accordance with the disclosed embodiments. In one embodiment, the method of FIG. 12 is performed by a security orchestrator 820, as illustrated in FIG. 8 and FIG. 10. In this context, a computing environment might refer to one or more computing devices (e.g., computing devices 702), VMs (e.g., VMs 706), or any combination thereof.

At block 1202, the security orchestrator identifies an existing computer security threat library used to provide security services to a computing environment. In one embodiment, the security orchestrator identifies an optimized protocol signatures 1004 and content signatures 1006 generated by the process illustrated in FIG. 11. In other embodiments, an existing protocol signature library and content signature library can be generated by another process or obtained from any other source. The existing computer security threat library is associated with at least one protocol and at least one content type. For example, the existing computer security threat library may include one or more protocol signatures 1004 related to various different types of protocols, and may further include one or more content signatures 1006 related to various different types of content.

At block 1204, the security orchestrator generates profile information for the computing environment. For example, a protocol classifier 1034 of a general probe 1026 might identify one or more new protocols (e.g., TCP, HTTP, SIP, etc.) used in network traffic sent or received by the computing environment. Similarly, a content classifier 1036 of a general probe 1026 might identify one or more new types of content sent, received, or stored by the computing environment (e.g., email messages, types of files, databases, etc.). In an embodiment, a protocol classifier 1034 and content classifier 1036 may scan a computing environment for new protocols and content types in response to a user request, based on a periodic schedule, in response to detecting a change to the computing environment (e.g., based on a received notification indicating a new hypervisor, VM, or application is running), or based on any other condition.

At block 1206, the security orchestrator determines whether the generated profile information is associated with one or more: a new protocol and a new content type. In an embodiment, a security orchestrator 1020 determines whether the generated profile information is associated with a new protocol or content type relative to the existing protocol signature library and content signature library identified at block 1202.

At block 1206, the security orchestrator 1020 generates an updated computer security threat library by adding, to the existing computer security threat library, one or more of: a protocol signature associated with a new protocol, and a content type signature associated with a new content type. For example, depending on whether the security orchestrator 1020 identifies one or more new protocols, one or more new content types, or both, the security orchestrator 1020 can add threat signatures (e.g., from a threat signature library 1012) which relate to the newly identified protocols and content types to the existing computer security threat library (e.g., to enable identification of threats relating to those newly identified protocols and content types). In one embodiment, the newly selected threat signatures relating to protocols identified by the protocol classifier 1034 can be added to protocol signatures 1004, and the newly selected threat signatures relating to content types identified by the content classifier can be added to the content signatures 1006.

At block 1210, the security orchestrator optionally adds, from the threat signature library 1012, threat signatures relating to one or more security policies to be applied to the computing environment. In reference to FIG. 10, for example, a security orchestrator 1020 selects threat signatures from signature library 1012 relating to one or more security policies 1008 to be applied to the computing environment. For example, a security policy from security policies 1008 might identify security rules which do not relate to any of the profile information obtained by a hypervisor probe 1022, VM probe 1024, or general probe 1026 (e.g., because the security rules relate to types of activity, network traffic, or content which has not yet occurred at the computing environment).

In some embodiments, the addition of signatures at blocks 1208-1210 is based on a combination of previously identified protocol and content types and newly identified protocol and content types. In some embodiments, the addition of signatures at blocks 1208-1210 is based on the newly identified protocol and content types which are subsequently combined with previously identified protocol and content types. In some embodiments, the addition of signatures at blocks 1208-1210 is based on configured aspects of policy such that signatures not corresponding to identified protocol or content types are added. As an example, one of security policies 1008 may relate to identifying encrypted content through the detection of secure protocol or content signatures regardless of whether or not such secure protocols or content types were identified by a probe.

At block 1212, the activity of the computing environment is analyzed using the updated computer security threat library. As described above, each of the separately updated signature sets can be used by various types of security services (e.g., a DPI service can use the updated protocol signatures 1004 and ignore the content signatures 1006, while a DLP service can use the updated content signatures 1006 and ignore the protocol signatures 1004). In other embodiments, the protocol signatures 1004 and content signatures 1006 can be updated together as part of a same library, or using any other groupings of signatures depending on types of security services to use the signatures.

4.0. Example Embodiments

Examples of some embodiments are represented, without limitation, by the following:

In an embodiment, a method or non-transitory computer readable medium comprises: obtaining a computer security threat library including a plurality of computer security threat definitions, wherein at least one computer security threat definition of the plurality of computer security threat definitions is associated with at least one computer security threat signature from a computer security threat signature library; generating profile information for the computing environment, wherein the profile information includes information relating to at least one hypervisor running on the computing environment, information relating to at least one virtual machine (VM) running on the at least one hypervisor, and information relating to network traffic associated with the at least one VM; determining, based on the profile information, that at least one particular computer security threat definition of the plurality of computer security threat definitions does not apply to the computing environment, wherein the at least one particular computer security threat definition is associated with at least one particular computer security threat signature from the computer security threat signature library; in response to determining that the at least one particular computer security threat definition of the plurality of computer security threat definitions does not apply to the computing environment, removing the at least one particular computer security threat signature from the computer security threat signature library to generate a reduced computer security threat signature library; adding, based on a computer security policy profile to be applied to the computing environment, at least one security threat signature to the reduced computer security threat signature library; and analyzing activity of the computing environment using the reduced computer security threat signature library.

In an embodiment, a method or non-transitory computer readable medium comprises: wherein a computer security threat signature from the computer security threat signature library includes at least one pattern against which a computer security application compares computer-related activity.

In an embodiment, a method or non-transitory computer readable medium comprises: wherein generating the profile information for the computing environment includes a hypervisor probe sending requests for hypervisor-related profile information, a VM probe sending requests for VM-related profile information, and a general probe monitoring the network traffic associated with the at least one VM.

In an embodiment, a method or non-transitory computer readable medium comprises: wherein generating the profile information for the computing environment includes performing a port scan of the computing environment.

In an embodiment, a method or non-transitory computer readable medium comprises: wherein the reduced computer security threat signature library includes a protocol signature library used by a deep packet inspection (DPI) security service.

In an embodiment, a method or non-transitory computer readable medium comprises: wherein the reduced computer security threat signature library includes a content signature library used by a data loss prevention (DLP) security service.

In an embodiment, a method or non-transitory computer readable medium comprises: wherein generating the profile information for the computing environment includes identifying network protocols used in the network traffic associated with the at least one VM.

In an embodiment, a method or non-transitory computer readable medium comprises: wherein generating the profile information for the computing environment includes: identifying network protocols used in the network traffic associated with the at least one VM; and identifying types of content included in the network traffic associated with the at least one VM.

In an embodiment, a method or non-transitory computer readable medium comprises: wherein the computer security policy includes at least one security-related rule to be applied to the computing environment, the security-related rule associated with one or more of: an access control list (ACL) policy, a malware policy, a data loss prevention (DLP) policy, and a threat detection policy.

In an embodiment, a method or non-transitory computer-readable medium comprises: identifying an existing computer security threat signature library used to provide security services to the computing environment, wherein the existing computer security threat signature library is associated with at least one protocol and at least one content type; generating profile information for the computing environment, the profile information identifying protocols and content types used by the computing environment; determining, relative to the existing computer security threat signature library, whether the profile information is associated with one or more of: a new protocol and a new content type; generating an updated computer security threat signature library by adding, to the existing computer security threat signature library, one or more of: a protocol signature associated with a new protocol, and a content type signature associated with a new content type; and analyzing activity of the computing environment using the updated computer security threat signature library.

In an embodiment, a method or non-transitory computer-readable medium comprises: wherein a computer security threat signature from the updated computer security threat signature library includes at least one pattern against which a computer security application compares computer-related activity.

In an embodiment, a method or non-transitory computer-readable medium comprises: wherein the updated computer security threat signature library includes a protocol signature library used by a deep packet inspection (DPI) security service.

In an embodiment, a method or non-transitory computer-readable medium comprises: wherein the updated computer security threat signature library includes a content signature library used by a data loss prevention (DLP) security service.

In an embodiment, a method or non-transitory computer-readable medium comprises: wherein the updated computer security policy includes at least one security-related rule to be applied to the computing environment, the security-related rule associated with one or more of: an access control list (ACL) policy, a malware policy, a data loss prevention (DLP) policy, and a threat detection policy.

In an embodiment, a method or non-transitory computer-readable medium comprises: adding, to the updated computer security threat signature library, at least one threat signature related to one or more security policies to be applied to the computing environment.

In an embodiment, a method or non-transitory computer readable medium comprises: wherein the computing environment is a server in a data center.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired, program logic, or both to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 13:
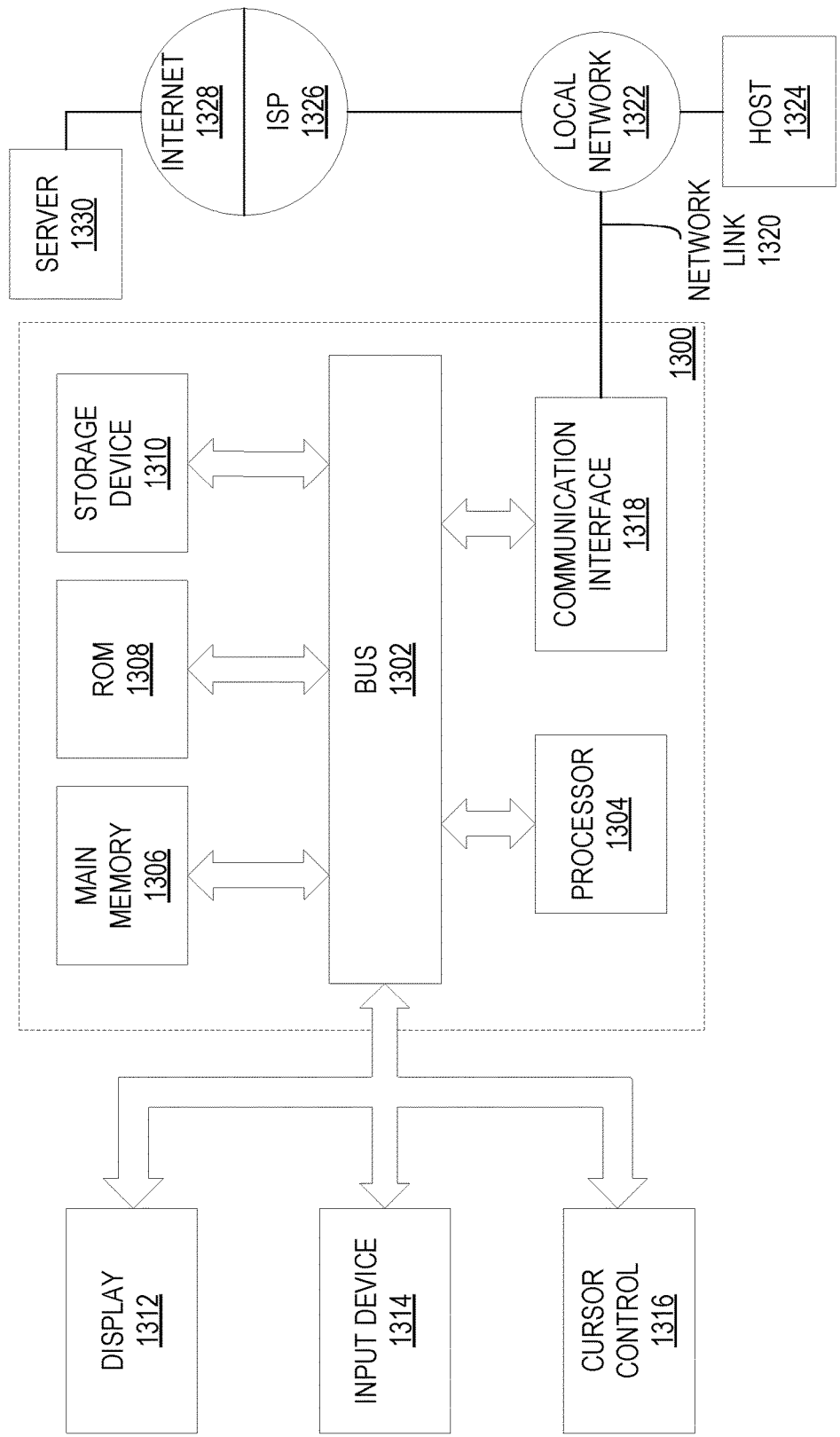
FIG. 13 illustrates a computer system upon which an embodiment may be implemented.

FIG. 13 is a block diagram that illustrates a computer system 1300 utilized in implementing the above-described techniques, according to an embodiment. Computer system 1300 may be, for example, a desktop computing device, laptop computing device, tablet, smartphone, server appliance, computing mainframe, multimedia device, handheld device, networking apparatus, or any other suitable device.

Computer system 1300 includes one or more buses 1302 or other communication mechanism for communicating information, and one or more hardware processors 1304 coupled with buses 1302 for processing information. Hardware processors 1304 may be, for example, general purpose microprocessors. Buses 1302 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1300 also includes a main memory 1306, such as a random access memory (RAM) or other dynamic or volatile storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 a special-purpose machine that is customized to perform the operations specified in the instructions.

Computer system 1300 further includes one or more read only memories (ROM) 1308 or other static storage devices coupled to bus 1302 for storing static information and instructions for processor 1304. One or more storage devices 1310, such as a solid-state drive (SSD), magnetic disk, optical disk, or other suitable non-volatile storage device, is provided and coupled to bus 1302 for storing information and instructions.

Computer system 1300 may be coupled via bus 1302 to one or more displays 1312 for presenting information to a computer user. For instance, computer system 1300 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1312 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1312.

One or more input devices 1314 are coupled to bus 1302 for communicating information and command selections to processor 1304. One example of an input device 1314 is a keyboard, including alphanumeric and other keys. Another type of user input device 1314 is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. Yet other examples of suitable input devices 1314 include a touch-screen panel affixed to a display 1312, cameras, microphones, accelerometers, motion detectors, and/or other sensors. In an embodiment, a network-based input device 1314 may be utilized. In such an embodiment, user input and/or other information or commands may be relayed via routers and/or switches on a Local Area Network (LAN) or other suitable shared network, or via a peer-to-peer network, from the input device 1314 to a network link 1320 on the computer system 1300.

A computer system 1300 may implement techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1300 can receive the data on the network and demodulate the signal to decode the transmitted instructions. Appropriate circuitry can then place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

A computer system 1300 may also include, in an embodiment, one or more communication interfaces 1318 coupled to bus 1302. A communication interface 1318 provides a data communication coupling, typically two-way, to a network link 1320 that is connected to a local network 1322. For example, a communication interface 1318 may be an integrated services digital network (ISDN) card, cable modem, satellite modem, or a modem to provide a data communication connection to a corresponding type of telephone line. As another example, the one or more communication interfaces 1318 may include a local area network (LAN) card to provide a data communication connection to a compatible LAN. As yet another example, the one or more communication interfaces 1318 may include a wireless network interface controller, such as a 802.11-based controller, Bluetooth controller, Long Term Evolution (LTE) modem, and/or other types of wireless interfaces. In any such implementation, communication interface 1318 sends and receives electrical, electromagnetic, or optical signals that carry digital data streams representing various types of information.

Network link 1320 typically provides data communication through one or more networks to other data devices. For example, network link 1320 may provide a connection through local network 1322 to a host computer 1324 or to data equipment operated by a Service Provider 1326. Service Provider 1326, which may for example be an Internet Service Provider (ISP), in turn provides data communication services through a wide area network, such as the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

In an embodiment, computer system 1300 can send messages and receive data, including program code and/or other types of instructions, through the network(s), network link 1320, and communication interface 1318. In the Internet example, a server X30 might transmit a requested code for an application program through Internet 1328, ISP 1326, local network 1322 and communication interface 1318. The received code may be executed by processor 1304 as it is received, and/or stored in storage device 1310, or other non-volatile storage for later execution. As another example, information received via a network link 1320 may be interpreted and/or processed by a software component of the computer system 1300, such as a web browser, application, or server, which in turn issues instructions based thereon to a processor 1304, possibly via an operating system and/or other intermediate layers of software components.

In an embodiment, some or all of the systems described herein may be or comprise server computer systems, including one or more computer systems 1300 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method to generate an optimized computer security threat signature library for a computing environment to which one or more security policies are to be applied, the method comprising:

obtaining a computer security threat library including a plurality of computer security threat definitions, wherein at least one computer security threat definition of the plurality of computer security threat definitions is associated with at least one computer security threat signature from a computer security threat signature library;

generating profile information for the computing environment, wherein the profile information includes information relating to at least one hypervisor running on the computing environment, information relating to at least one virtual machine (VM) running on the at least one hypervisor, and information relating to network traffic associated with the at least one VM;

determining, based on the profile information, that at least one particular computer security threat definition of the plurality of computer security threat definitions does not apply to the computing environment, wherein the at least one particular computer security threat definition is associated with at least one particular computer security threat signature from the computer security threat signature library;

in response to determining that the at least one particular computer security threat definition of the plurality of computer security threat definitions does not apply to the computing environment, removing the at least one particular computer security threat signature from the computer security threat signature library to generate a reduced computer security threat signature library;

adding, based on a computer security policy profile to be applied to the computing environment, at least one security threat signature to the reduced computer security threat signature library; and analyzing activity of the computing environment using the reduced computer security threat signature library.

2. The method of claim 1, wherein a computer security threat signature from the computer security threat signature library includes at least one pattern against which a computer security application compares computer-related activity.

3. The method of claim 1, wherein generating the profile information for the computing environment includes a hypervisor probe sending requests for hypervisor-related profile information, a VM probe sending requests for VM-related profile information, and a general probe monitoring the network traffic associated with the at least one VM.

4. The method of claim 1, wherein generating the profile information for the computing environment includes performing a port scan of the computing environment.

5. The method of claim 1, wherein the reduced computer security threat signature library includes a protocol signature library used by a deep packet inspection (DPI) security service.

6. The method of claim 1, wherein the reduced computer security threat signature library includes a content signature library used by a data loss prevention (DLP) security service.

7. The method of claim 1, wherein generating the profile information for the computing environment includes identifying network protocols used in the network traffic associated with the at least one VM.

8. The method of claim 1, wherein generating the profile information for the computing environment includes:
   identifying network protocols used in the network traffic associated with the at least one VM; and
   identifying types of content included in the network traffic associated with the at least one VM.

9. The method of claim 1, wherein the computer security policy includes at least one security-related rule to be applied to the computing environment, the security-related rule associated with one or more of: an access control list (ACL) policy, a malware policy, a data loss prevention (DLP) policy, and a threat detection policy.

10. The method of claim 1, wherein the computing environment is a server in a data center.

11. A non-transitory computer-readable storage medium storing instructions which, when executed by one or more processors, cause performance of operations comprising:
   obtaining a computer security threat library including a plurality of computer security threat definitions, wherein at least one computer security threat definition of the plurality of computer security threat definitions is associated with at least one computer security threat signature from a computer security threat signature library;
   generating profile information for a computing environment, wherein the profile information includes information relating to at least one hypervisor running on the computing environment, information relating to at least one virtual machine (VM) running on the at least one hypervisor, and information relating to network traffic associated with the at least one VM;
   determining, based on the profile information, that at least one particular computer security threat definition of the plurality of computer security threat definitions does not apply to the computing environment, wherein the at least one particular computer security threat definition is associated with at least one particular computer security threat signature from the computer security threat signature library;
   in response to determining that the at least one particular computer security threat definition of the plurality of computer security threat definitions does not apply to the computing environment, removing the at least one particular computer security threat signature from the computer security threat signature library to generate a reduced computer security threat signature library;
   adding, based on a computer security policy profile to be applied to the computing environment, at least one security threat signature to the reduced computer security threat signature library; and
   analyzing activity of the computing environment using the reduced computer security threat signature library.

12. The non-transitory computer-readable storage medium of claim 11, wherein a computer security threat signature from the computer security threat signature library includes at least one pattern against which a computer security application compares computer-related activity.

13. The non-transitory computer-readable storage medium of claim 11, wherein generating the profile information for the computing environment includes a hypervisor probe sending requests for hypervisor-related profile information, a VM probe sending requests for VM-related profile information, and a general probe monitoring the network traffic associated with the at least one VM.

14. The non-transitory computer-readable storage medium of claim 11, wherein the reduced computer security threat signature library includes a protocol signature library used by a deep packet inspection (DPI) security service and a content signature library used by a data loss prevention (DLP) security service.

15. The non-transitory computer-readable storage medium of claim 11, wherein generating the profile information for the computing environment includes:
   identifying network protocols used in the network traffic associated with the at least one VM; and
   identifying types of content included in the network traffic associated with the at least one VM.

16. An apparatus, comprising:
   one or more processors;
   a non-transitory computer-readable storage medium coupled to the one or more processors, the computer-readable storage medium storing instructions which, when executed by the one or more processors, causes the apparatus to:
      obtain a computer security threat library including a plurality of computer security threat definitions, wherein at least one computer security threat definition of the plurality of computer security threat definitions is associated with at least one computer security threat signature from a computer security threat signature library;
      generate profile information for a computing environment, wherein the profile information includes information relating to at least one hypervisor running on the computing environment, information relating to at least one virtual machine (VM) running on the at least one hypervisor, and information relating to network traffic associated with the at least one VM;
      determine, based on the profile information, that at least one particular computer security threat definition of the plurality of computer security threat definitions does not apply to the computing environment, wherein the at least one particular computer security threat definition is associated with at least one particular computer security threat signature from the computer security threat signature library;
      in response to determining that the at least one particular computer security threat definition of the plurality of computer security threat definitions does not apply to the computing environment, remove the at least one particular computer security threat signature from the computer security threat signature library to generate a reduced computer security threat signature library;
add, based on a computer security policy profile to be applied to the computing environment, at least one security threat signature to the reduced computer security threat signature library; and
analyze activity of the computing environment using the reduced computer security threat signature library.

17. The apparatus of claim 16, wherein a computer security threat signature from the computer security threat signature library includes at least one pattern against which a computer security application compares computer-related activity.

18. The apparatus of claim 16, wherein generating the profile information for the computing environment includes a hypervisor probe sending requests for hypervisor-related profile information, a VM probe sending requests for VM-related profile information, and a general probe monitoring the network traffic associated with the at least one VM.

19. The apparatus of claim 16, wherein the reduced computer security threat signature library includes a protocol signature library used by a deep packet inspection (DPI) security service and a content signature library used by a data loss prevention (DLP) security service.

20. The apparatus of claim 16, wherein generating the profile information for the computing environment includes:
identifying network protocols used in the network traffic associated with the at least one VM; and
identifying types of content included in the network traffic associated with the at least one VM.

* * * * *